United States Patent
Samuel et al.

(10) Patent No.: US 11,494,495 B2
(45) Date of Patent: Nov. 8, 2022

(54) SYSTEM AND METHOD FOR FIRMWARE IMAGE INTEGRITY VERIFICATION

(71) Applicant: DELL PRODUCTS, LP, Round Rock, TX (US)

(72) Inventors: Balasingh Samuel, Round Rock, TX (US); Ricardo L. Martinez, Leander, TX (US); Anand Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 16/881,250

(22) Filed: May 22, 2020

(65) Prior Publication Data
US 2021/0365558 A1   Nov. 25, 2021

(51) Int. Cl.
*G06F 21/57*   (2013.01)
*G06F 8/654*   (2018.01)
*G06F 21/60*   (2013.01)

(52) U.S. Cl.
CPC ............ *G06F 21/572* (2013.01); *G06F 8/654* (2018.02); *G06F 21/602* (2013.01)

(58) Field of Classification Search
CPC ....... G06F 21/572; G06F 8/654; G06F 21/602
See application file for complete search history.

(56) References Cited

U.S. PATENT DOCUMENTS

| | | | | |
|---|---|---|---|---|
| 6,138,236 A * | 10/2000 | Mirov | ....................... | G06F 9/24 |
| | | | | 712/E9.007 |
| 9,779,230 B2 | 10/2017 | Hamlin et al. | | |
| 9,930,051 B1 * | 3/2018 | Potlapally | ............. | H04L 63/126 |
| 10,019,577 B2 | 7/2018 | Robison et al. | | |
| 10,353,779 B2 | 7/2019 | Sharma et al. | | |
| 2013/0185548 A1 * | 7/2013 | Djabarov | ............... | G06F 21/575 |
| | | | | 713/2 |
| 2017/0085383 A1 * | 3/2017 | Rao | ........................ | G06F 21/575 |

* cited by examiner

*Primary Examiner* — Gary Collins
(74) *Attorney, Agent, or Firm* — Larson Newman, LLP (57) ABSTRACT

An information handling system stores a hash values for firmware components for the information handling system. A processor receives an off-host image verification request from a second information handling system. In response to the off-host image verification request, the processor reads first metadata for a next firmware component, provides the first metadata to the second information handling system, and receives a golden hash value from the second information handling system. In response to the first hash value not matching the golden hash value, the processor applies a mitigation policy. In response to the first hash value matching the golden hash value, the processor provides a device verification signal.

20 Claims, 4 Drawing Sheets

SYSTEM AND METHOD FOR FIRMWARE IMAGE INTEGRITY VERIFICATION

FIELD OF THE DISCLOSURE

The present disclosure generally relates to information handling systems, and more particularly relates to performing firmware image integrity verification.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements may vary between different applications. Thus information handling systems may also vary regarding what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, graphics interface systems, data storage systems, networking systems, and mobile communication systems. Information handling systems may also implement various virtualized architectures. Data and voice communications among information handling systems may be via networks that are wired, wireless, or some combination.

SUMMARY

An information handling system may store hash values for firmware components. A different hash value corresponds to a different firmware component. In response to an off-host image verification request, a processor may read first metadata for a next firmware component. The processor may provide the first metadata for the next firmware component to a second information handling system, and receive a golden hash value from the second information handling system. The golden hash value is based on the first metadata for the next firmware component in the second information handling system. The processor may retrieve a first hash value from the memory based on the first metadata for the next firmware component, and determine whether the first hash value matches the golden hash value. In response to the first hash value not matching the golden hash value, the processor may apply a mitigation policy. In response to the first hash value matching the golden hash value, the processor may provide a device verification signal.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
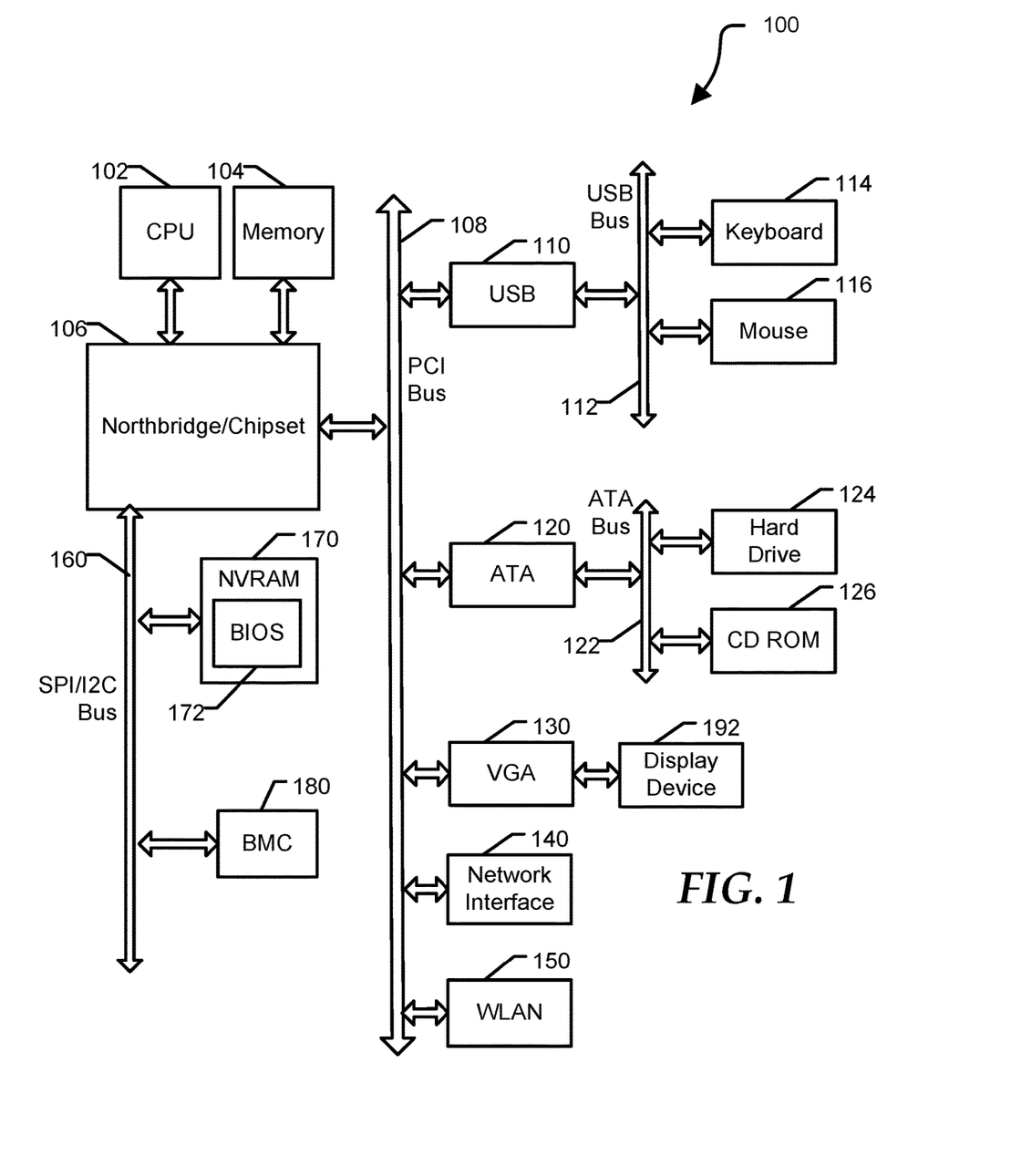
FIG. 1 is a block diagram of a general information handling system according to at least one embodiment of the disclosure.

FIG. 1 illustrates a general information handling system 100 including a processor 102, a memory 104, a northbridge/chipset 106, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an embodiment, information handling system 100 may be information handling system 200 of FIG. 2. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skilled in the art will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 190 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
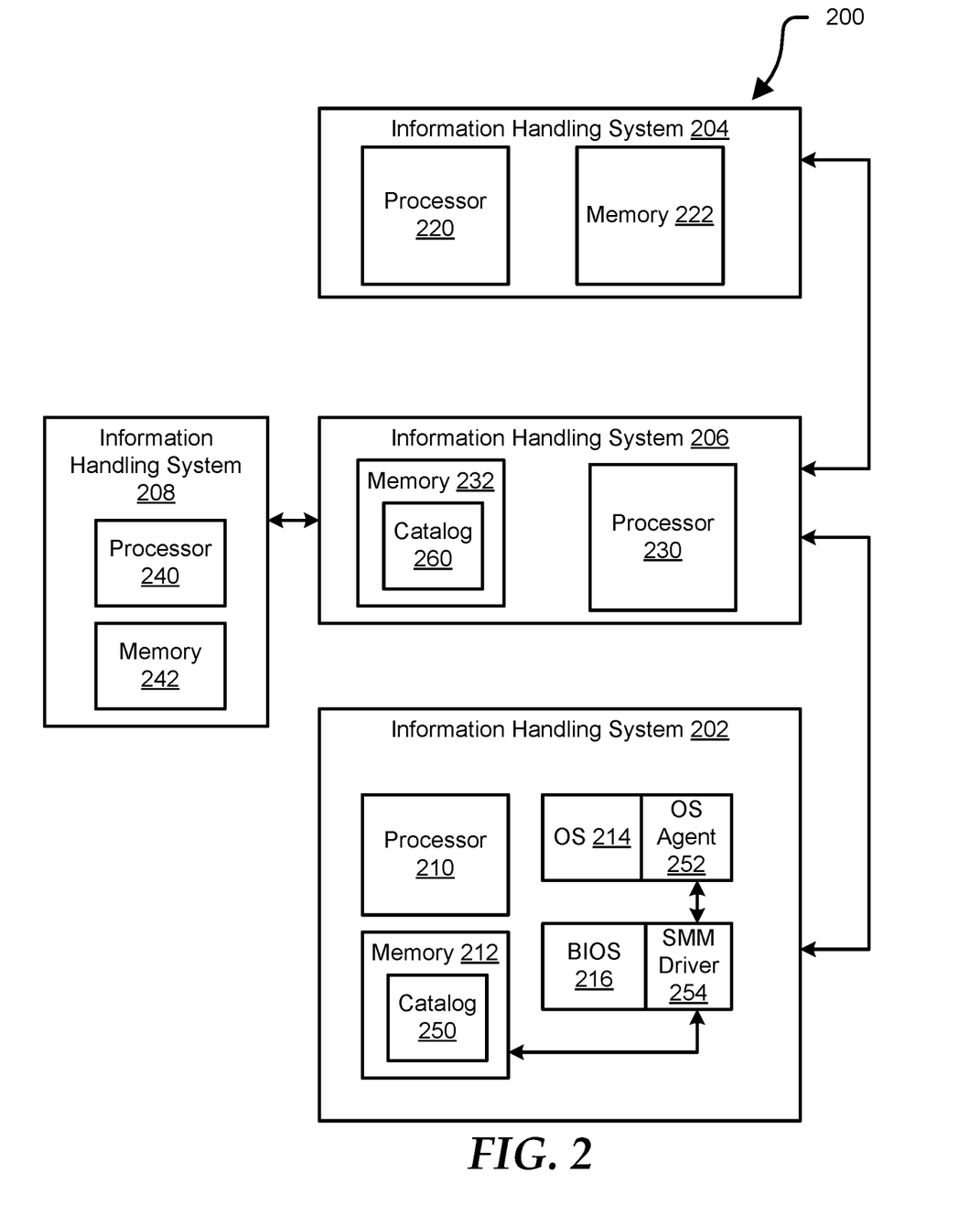
FIG. 2 is a block diagram of a system including portions of multiple information handling systems for verifying firmware images according to at least one embodiment of the disclosure.

FIG. 2 shows a system 200 including portions of information handling systems 202, 204, and 206 for verifying firmware images according to at least one embodiment of the disclosure. Information handling systems 202, 204, 206, and 208 may be individually included in any suitable system with any additional components including, but not limited to, a personal computer, a server, one or more server racks, and a display device. Each of information handling systems 202, 204, 206, and 208 may be individually employed, in whole or in part, by information handling system 100 illustrated in FIG. 1, or any other system, device, component, or the like operable to employ portions, or all of, the information handling system. For example, information handling system 202 may be a server, information handling system 204 may be an information technology (IT) console, information handling system 206 may be a backend server, and information handling system 208 may be a basic input/output system (BIOS) build server. Information handling system 202 includes a processor 210 and a memory 212. Information handling system 204 includes a processor 220 and a memory 222. Information handling system 206 includes a processor 230 and a memory 232. Information handling system 208 includes a processor 240 and a memory 242. In an example, information handling systems 202, 204, 206, and 208 may include more components than shown in FIG. 2 without varying from the scope of this disclosure. In an example, the other components may include any suitable components including, but not limited to, one or more processors, one or more memory devices, one or more fans, and one or more PCIe devices.

Memory 212 may be communicatively coupled to processor 210 and may include any system, device, or apparatus configured to retain program instructions and/or data for a period of time (e.g., computer-readable media). Memory 222 may be communicatively coupled to processor 220 and may include any system, device, or apparatus configured to retain program instructions and/or data for a period of time (e.g., computer-readable media). Memory 232 may be communicatively coupled to processor 230 and may include any system, device, or apparatus configured to retain program instructions and/or data for a period of time (e.g., computer-readable media). Memories 212, 222, and 232 may include RAM, EEPROM, a PCMCIA card, flash memory, magnetic storage, opto-magnetic storage, or any suitable selection and/or array of volatile or non-volatile memory that retains data after power to respective information handling systems 202, 204, and 206 is turned off. Memories 212, 222, and 232 may comprise a persistent memory (e.g., comprising one or more NVDIMMs) that includes a volatile memory (e.g., DRAM or other volatile random-access memory) and non-volatile memory (e.g., flash memory or other non-volatile memory). In an example, memory 212 may include a firmware catalog 250, which in turn stores metadata for each firmware component downloaded by information handling 202. In an example, catalog 250 may be referred to as a local catalog based on the catalog including the metadata for firmware component updates received by information handling system 202 or a local server. In certain examples, catalog 250 may include multiple catalogs, and each separate catalog may be labeled with the system ID for a different platform model. Memory 232 may include a firmware catalog 260, which in turn stores metadata for each firmware component provide by information handling system 206. In an example, catalog 260 may be referred to as a golden catalog based on the catalog included the metadata firmware component updates as provided by information handling system 206 or a BIOS build backend server. In certain examples, catalog 260 may include multiple catalogs, and each separate catalog may be labeled with the system ID for a different platform model.

Processors 210, 220, and 230 may include any system, device, or apparatus configured to interpret and/or execute program instructions and/or process data, and may include, without limitation a microprocessor, microcontroller, or any other digital or analog circuitry configured to interpret and/or execute program instructions and/or process data. In some examples, processors 210, 220, and 230 may interpret and/or execute program instructions and/or process data stored in respective memories 212, 222, and 232. Processor 210 may be configured to run OS 214, such as Windows-based OS, Linux-based OS, or the like, during in-band operation, and can be configured to run BIOS 216 Firmware Management Protocol (FMP) based pre-boot code, such as Dell Life Cycle Controller, during out-of-band operation as needed. In an example, information handling system 206 may communicate with information handling systems 202, 204 and 208 via a web interface. For example, information handling system 202 may utilize a web interface implemented by processor 210 executing OS agent 252 of OS 214.

BIOS 216 may provide information handling system 202 with integrity and security by implementing a fundamental protection layer for the information handling system. Previous information handling system may implement runtime integrity measurement and verification of BIOS component firmware updates. Additionally, previous information handling systems may also implement off-host verification operations for BIOS updates. However, system 200 may involve information handling systems with modular system architectures, and the updatable firmware packages may be independently updated. These two characteristics of system 200 may cause a problem with previous off-host verification operations. For example, a previous off-host integrity measurement may be invalidated if any one of the firmware components is updated independently. Thus, previous information handling systems may not accurately validate a chain of trust for BIOS firmware updates from a secure build process, because there was a potential golden measurement mismatch on an information handling system and an off-host value. Therefore, information handling system 202 may be improved with more robust integrity verification of BIOS component firmware updates with additional data being added to catalogs 250 and 260 for the verification operations.

During operation, information handling system 208 may generate or build a new BIOS component firmware update and create an offline measurement payload for the update. In an example, the offline measurement payload may include any suitable metadata associated with the BIOS component firmware update. For example, the metadata may include, but is not limited to, a system identifier (ID), a payload ID, and a payload version for the BIOS component firmware update. In certain examples, the offline measurement payload may be signed by information handling system 208, which may be a hardware security module (HSM) server.

Upon information handling system 208 creating the new BIOS component firmware update, the information handling system may provide the update along with the offline measurement payload to information handling system 206. In an example, the firmware update may be for a BIOS component 2, and the offline measure payload or metadata associated with the update may be any suitable metadata to identify the update. For example, the metadata may include a system ID of 5900, version number of 1.7.3, and payload ID of GUID_BIOS_COMP2.

In an example, information handling system 206 may perform one or more operations to add or upend the offline measurement payload for the BIOS component firmware update to the proper catalog within the golden measurement database or catalog 260. For example, information handling system 206 may identify the system ID for the BIOS firmware update, such as system ID of 59000, add the offline measurement payload to a row of the catalog or table. An exemplary catalog or table within catalog 260 is illustrated as Table 1 below:

TABLE 1

| System ID (5900) | Version | Payload ID | Hash Value |
|---|---|---|---|
| | 1.0.0 | GUID_BIOS_COMP1 | HASH_BIOS_COMP1_V1 |
| | 1.5.9 | GUID_BIOS_COMP2 | HASH_BIOS_COMP2_V1 |

TABLE 1-continued

| System ID (5900) | Version | Payload ID | Hash Value |
|---|---|---|---|
| | 1.0.9 | GUID_BIOS_COMP3 | HASH_BIOS_COMP3_V1 |
| | 1.6.0 | GUID_EC | HASH_EC_V1 |
| | 3.7.5 | GUID_ME | HASH_ME_V1 |
| | 1.0.2 | GUID_BIOS_COMP1 | HASH_BIOS_COMP1_V2 |
| | 1.7.3 | GUID_BIOS_COMP2 | HASH_BIOS_COMP2_V2 |

As shown in Table 1 above, the metadata for the BIOS firmware update, such as system ID of 5900, version number of 1.7.3, and payload ID of GUID_BIOS_COMP2, is added to the catalog 260.

Upon storing the offline measurement payload for the BIOS firmware update to the proper table in catalog 260, information handling system 206 may also generate a hash value for the metadata and store the hash value to the table as shown in Table 1 above. In an example, the hash value generated by information handling system 206 and stored in catalog 260 may be referred to as the golden hash value based on the hash value being located on the backend server of system 200.

In an example, catalog 260 may include different catalogs or firmware volumes, FV_INTEG, and each volume may be identified based on the system ID. For example, Table 1 above is identified by system ID 59000 and exemplary Table 2 below is identified by system ID 6300.

TABLE 2

| System ID (6300) | Version | Payload ID | Hash Value |
|---|---|---|---|
| | 1.2.3 | GUID_BIOS_COMP1 | HASH_BIOS_COMP1_V1 |
| | 1.3.5 | GUID_BIOS_COMP1 | HASH_BIOS_COMP1_V2 |

As shown in Tables 1 and 2 above, each firmware volume within catalog 260 has multiple entries for the different firmware updates within system 200, and each entry includes a version, a payload ID, and a hash value for the update. Additionally, the firmware volumes represented by Tables 1 and 2 may store a history of hash values along with metadata information to track an update history for each firmware component stored in information handling system 202.

Upon receiving a new BIOS component firmware update, information handling system 206 may provide the update to information handling system 202, which in turn may perform one or more suitable operations to store the update in a proper firmware volume of catalog 250. In an example, information handling system 202 may receive the firmware update via OS agent 252 of OS 214 executed by processor 210. OS agent 252 may then provide the firmware update to BIOS 216 via any suitable interface. In an example, the interface between OS agent 252 a secure management mode (SMM) driver 254 of BIOS 216 may including, but is not limited to, a system management interrupt (SMI) interface and windows management interrupt (WMI) interface. SMM driver 254 may store the BIOS firmware update in catalog 250 of memory 212. In an example, the interface between SMM driver 254 and memory 212 may be any suitable interface including, but not limited to, a hardware access interface.

As stated above, memory 212 may be a flash device, such as a serial peripheral interface (SPI) flash memory device. Catalog 250 may be stored in memory 212 via any suitable operation. For example, catalog 250 may be initially provisioned with one or more firmware volumes using an existing flash process during a factory process of information handling system 202 to store the offline measurement payload for all BIOS component firmware versions included in the information handling system.

In response to information handling system 202 receiving a new BIOS component firmware update, processor 210 may utilize OS 214 and BIOS 216 to add the update to the proper firmware volume in catalog 250 by the same or similar operations as discussed above. In an example, processor 210 may utilize the offline measurement payload or metadata for a BIOS firmware update to create a local hash value for the update, and may then store the local hash value with the other metadata for the update in the firmware volume of catalog 250. In certain examples, hash value stored in catalog 250 may be referred to as a local hash value based on the hash value being stored locally in a memory on an end-point device, such as memory 212 of information handling system 202.

In an example, information handling system 204 may perform one or more operations to initiate a firmware image verification for the firmware updates stored in catalog 250 of information handling system 202. For example, an IT console server application stored in memory 222 and executed by processor 220 of information handling system 204 may send a firmware verification request to information handling system 206. In an example, the firmware verification request may be generated in response to one or more suitable trigger events including, but not limited to, a periodically scheduled event, a security incident, a firmware recovery, and a firmware recovery. In certain examples, the periodically scheduled events may be scheduled and stored in memory 222 by an IT administrator of system 200.

Figure 3:
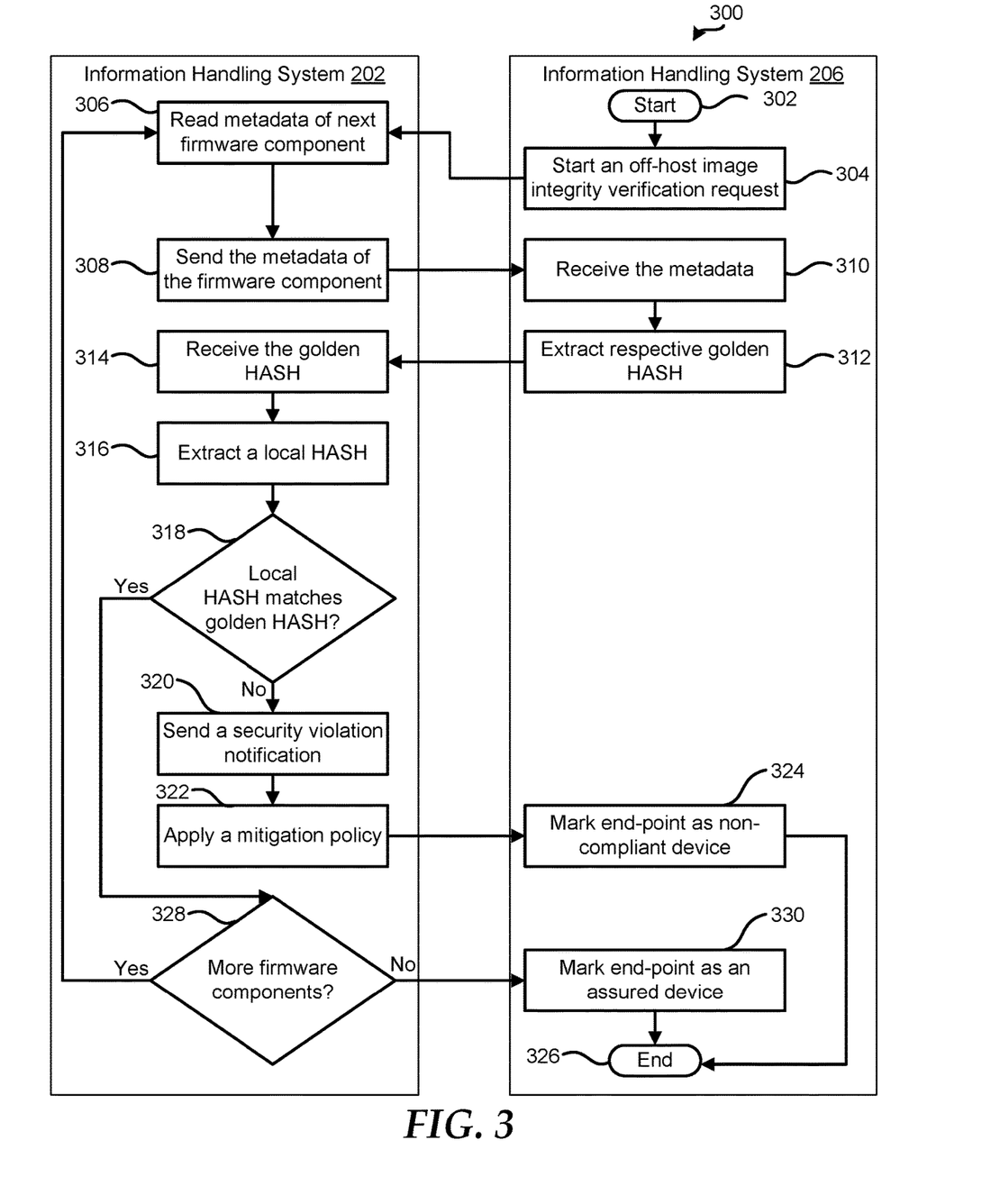
FIG. 3 is a flow diagram illustrating a method for verifying firmware images in an information handling system according to at least one embodiment of the disclosure.
Figure 4:
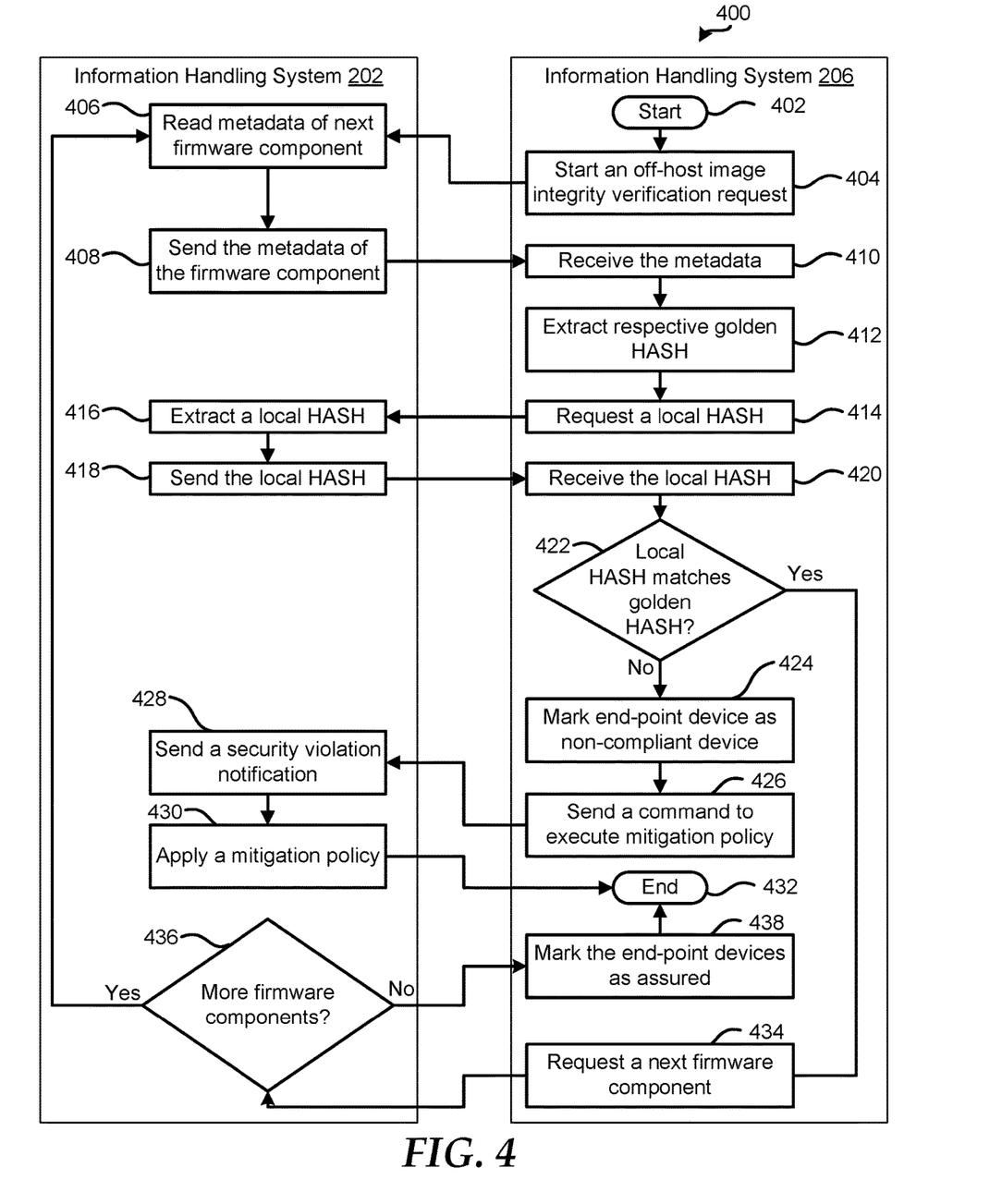
FIG. 4 is a flow diagram illustrating another method for verifying firmware images in an information handling system according to at least one embodiment of the disclosure.

In response to receiving the firmware verification request, information handling system 206 may begin any suitable process or set of operations to perform the firmware verification including, but not limited to, an end-point device verification, and a backend server verification. In an example, the end-point device verification process will be described with respect to FIG. 3 and the backend server verification processor will be described with respect to FIG. 4. In FIGS. 3 and 4, information handling system 202 may be an end-point device, and information handling system 206 may be a backend server.

FIG. 3 is a flow diagram illustrating a method 300 for verifying firmware images in an information handling system according to at least one embodiment of the disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by information handling system 100 depicted in FIG. 1, information handling systems 202 and 206 described in FIG. 2, or any other type of system, controller, device, module, processor, or any combination thereof, operable to employ all, or portions of, the method of FIG. 3.

At block 304, information handling system 206 may provide an off-host image verification request to information handling system 202. In response to the off-host image verification request, information handling system 202 may read metadata of a next firmware component at block 306. In an example, the metadata may be read from a firmware volume of catalog 250 in memory 212. The metadata may be any suitable data to identify the next firmware component including, but not limited to, system ID, payload ID, and version. In an example, the next firmware component may be selected in any suitable manner including, but not limited to, a first entry in the firmware volume, such as the top most entry or bottom most entry, a next lower entry or next higher entry if that entry has already been verified. The selection process may continue until a BIOS component firmware update is selected that has not been verified. At block 308, information handling system 202 may provide the metadata to information handling system 206. At block 310, information handling system 206 receives the metadata from information handling system 202.

At block 312, information handling system 206 may extract a golden hash for the next firmware component from catalog 260. In an example, the golden hash may be extracted in any suitable manner. For example, processor 230 may utilize the received metadata to identify a proper golden hash. In an example, the processor 230 may match the system ID, the payload ID, and version in a particular row of a firmware volume within catalog 260 and extract the golden hash value in the corresponding row of the firmware volume. At block 314, information handling system 202 may receive the golden hash from information handling system 206. In an example, information handling system 206 may encrypt the golden hash value before sending the golden hash value to information handling system 202.

At block 316, information handling system 202 may extract the local hash for the next firmware component. In an example, the local hash may be extracted in any suitable manner. For example, processor 210 may utilize the metadata to identify a proper local hash. In an example, the processor 210 may match the system ID, the payload ID, and version in a particular row of a firmware volume within catalog 250 and extract the local hash value in the corresponding row of the firmware volume. At block 318, a determination is made whether the local hash matches the golden hash. In an example, processor 210 may compare the local hash value with the golden hash value to determine whether a match exists between the hash values. For example, processor 210 may execute the SMM driver 254 to perform the comparison.

If the hash values do not match, the image integrity of the firmware update fails and a security violation notification may be sent at block 320. In an example, the security violation notification may be provided in any suitable manner including, but not limited to, displaying a message on a display device associated with information handling system 202, and providing the security violation notification to an IT administrator associated with information handling system 204. At block 322, a mitigation policy is applied. In an example, the mitigation policy may be any suitable policy including, but not limited to, updating new firmware, and recovering to a known firmware version. Information handling system 202 may notify information handling system 206 of the image integrity failure for the firmware update of the next BIOS component firmware. At block 324, information handling system 206 may mark information handling system 202 as a non-complaint device, and the method ends at block 326.

If the hash values match, a determination is made whether more firmware components need to be verified at block 328. If more firmware components need to be verified, the flow continues as stated above at block 306. However, if no additional firmware components need to be verified, information handling system 202 is marked as an assured endpoint device at block 330, and the method ends at block 326.

FIG. 4 is a flow diagram illustrating a method 400 for verifying firmware images in an information handling system according to at least one embodiment of the disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 4.

At block 404, information handling system 206 may provide an off-host image verification request to information handling system 202. In response to the off-host image verification request, information handling system 202 may read metadata of a next firmware component at block 406. In an example, the metadata may be read from a firmware volume of catalog 250 in memory 212. The metadata may be any suitable data to identify the next firmware component including, but not limited to, system ID, payload ID, and version. In an example, the next firmware component may be selected in any suitable manner including, but not limited to, a first entry in the firmware volume, such as the top most entry or bottom most entry, a next lower entry or next higher entry if that entry has already been verified. The selection process may continue until a BIOS component firmware update is selected that has not been verified. At block 408, information handling system 202 may provide the metadata to information handling system 206. In certain examples, information handling system 202 may send the metadata for each firmware component individually in series as described herein, or may send the metadata for all of the firmware components within catalog 250 collectively as one single response without varying from the scope of this disclosure. At block 410, information handling system 206 may receive the metadata from information handling system 202.

At block 412, information handling system 206 may extract a golden hash for the next firmware component from catalog 260. In an example, the golden hash may be extracted in any suitable manner. For example, processor 230 may utilize the received metadata to identify a proper golden hash. In an example, the processor 230 may match the system ID, the payload ID, and version in a particular row of a firmware volume within catalog 260 and extract the golden hash value in the corresponding row of the firmware volume. At block 414, information handling system 206 may request a local hash value for the next BIOS component firmware update from information handling system 202. At block 416, information handling system 202 may extract the local hash for the next firmware component. In an example, the local hash value may be extracted in any suitable manner. For example, processor 210 may utilize the metadata to identify a proper local hash value. In an example, the processor 210 may match the system ID, the payload ID, and version in a particular row of a firmware volume within catalog 250 and extract the local hash value in the corresponding row of the firmware volume. At block 418, information handling system 202 may send the local hash value to information handling system 206. For example, OS agent 252 may provide the local hash value to information handling system 206. In an example, information handling system 202 may encrypt the local hash value before sending the local hash value to information handling system 206, and the communication between the information handling systems may be via a secured communication path based on a cryptographic communication model. In certain examples, the local hash value may be send with the metadata at block 408 instead of being sent separately without varying from the scope of this disclosure.

At block 420, information handling system 206 may receive the local hash value from information handling system 202. At block 422, a determination is made whether the local hash matches the golden hash. In an example, processor 230 may compare the local hash value with the golden hash value to determine whether a match exists between the hash values. For example, processor 230 may execute a SMM driver to perform the comparison.

If the hash values do not match, the image integrity of the firmware update fails and information handling system 206 may mark information handling system 202 as a non-complaint device at block 424. At block 426, information handling system 206 may send information handling system 202 a command to execute a mitigation policy. At block 428, a security violation notification may be sent. In an example, the security violation notification may be provided in any suitable manner including, but not limited to, displaying a message on a display device associated with information handling system 202, and providing the security violation notification to an IT administrator associated with information handling system 204. At block 430, a mitigation policy is applied, and the method ends at block 432. In an example, the mitigation policy may be any suitable policy including, but not limited to, updating new firmware, and recovering to a known firmware version.

If the hash values match, the image integrity is valid and information handling system 206 request a next firmware component from information handling system 202 at block 434. At block 436, a determination is made whether more firmware components need to be verified. If more firmware components need to be verified, the flow continues as stated above at block 406. However, if no additional firmware components need to be verified, information handling system 206 marks information handling system 202 as an assured end-point device at block 438, and the method ends at block 432.

Thus, off-host firmware image verification may be performed by information handling systems 202 and 206 to verify independently updateable firmware components to improve the information handling systems to provide a key security strategy for end-point assurance. Additionally, the history of hash values along with metadata information tracking the update history for each firmware component may be utilized as a post-breach investigation tool for cyber security and threat intelligence team to determine when a breach occurred within information handling system 202.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module may include software, including firmware embedded at a processor or software capable of operating a relevant environment of the information handling system. The device or module may also include a combination of the foregoing examples of hardware or software. Note that an information handling system may include an integrated circuit or a board-level product having portions thereof that may also be any combination of hardware and software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
a memory to store a plurality of hash values for a plurality of firmware components for the information handling system, wherein a different one of the hash values corresponds to a different one of the firmware components; and
a processor to:
receive, from a second information handling system, an off-host image verification request;
in response to the off-host image verification request, read first metadata for a next firmware component;
provide the first metadata for the next firmware component to the second information handling system;
receive a golden hash value from the second information handling system, wherein the golden hash value is based on the first metadata for the next firmware component in the second information handling system;
retrieve a first hash value from the memory based on the first metadata for the next firmware component;
determine whether the first hash value matches the golden hash value;
in response to the first hash value not matching the golden hash value, apply a mitigation policy; and
in response to the first hash value matching the golden hash value, provide a device verification signal.

2. The information handling system of claim 1, wherein the processor further to:
receive, from an update server, a new firmware component;
generate a local hash value for the new firmware component based on second metadata of the new firmware component; and
store the local hash value in the memory, wherein the local hash value is associated with the second metadata.

3. The information handling system of claim 2, wherein the storage of the local hash value in the memory includes the processor further to:
update a local system firmware volume data with the local hash value and the second metadata for the new firmware component.

4. The information handling system of claim 1, wherein the first metadata includes a system identifier, a payload version, and a payload identifier of the next firmware component.

5. The information handling system of claim 1, the application of the mitigation policy includes the processor further to:
trigger a new firmware update for the next firmware component of the information handling system.

6. The information handling system of claim 1, the application of the mitigation policy includes the processor further to:
recover to a previous firmware package version for the next firmware component of the information handling system.

7. The information handling system of claim 1, wherein the determination of whether the first hash value matches the golden hash value includes the processor further to:
compare, by a secure system management mode driver of the processor, the first hash value with the golden hash value.

8. The information handling system of claim 1, wherein in response to the first hash value not matching the golden hash value, the processor further to send a security violation notification.

9. The information handling system of claim 1, wherein the memory is a serial peripheral interface flash memory.

10. A method, comprising:
storing, in a memory, a plurality of hash values for a plurality of firmware components for an information handling system, wherein a different hash value of the hash values corresponds to a different firmware component of the firmware components;
receiving, by a processor of the information handling system, an off-host image verification request from a second information handling system;
in response to the off-host image verification request, reading first metadata for a next firmware component;
providing the first metadata for the next firmware component to the second information handling system;
receiving a golden hash value from the second information handling system, wherein the golden hash value is based on the first metadata for the next firmware component;
retrieving a first hash value from the memory based on the first metadata for the next firmware component;
if first hash value does not match the golden hash value, then applying a mitigation policy; and
else providing a device verification signal.

11. The method of claim 10, further comprising:
receiving, from an update server, a new firmware component;
generating a local hash value for the new firmware component based on second metadata of the new firmware component; and
storing the local hash value in the memory, wherein the local hash value is associated with the second metadata.

12. The method of claim 11, wherein the storing of the local hash value in the memory further comprises:
updating a local system firmware volume data with the local hash value and the second metadata for the new firmware component.

13. The method of claim 10, wherein the first metadata includes a system identifier, a payload version, and a payload identifier of the next firmware component.

14. The method of claim 10, the applying of the mitigation policy further comprises:
triggering a new firmware update for the next firmware component of the information handling system.

15. The method of claim 10, the applying of the mitigation policy further comprises:
recovering to a previous firmware package version for the next firmware component of the information handling system.

16. The method of claim 10, wherein the determining of whether the first hash value matches the golden hash value further comprises:
comparing, by a secure system management mode driver of the processor, the first hash value with the golden hash value.

17. The method of claim 10, further comprising:
in response to the first hash value not matching the golden hash value, sending, by the processor a security violation notification.

18. A non-transitory computer-readable medium including code that when executed by a processor causes the processor to perform a method, the method comprising:
- providing an off-host image verification request to an information handling system;
- receiving first metadata associated with a next firmware component;
- generating a golden hash value based on the first metadata;
- requesting a local hash value for the next firmware component;
- receiving the local hash value from the information handling system;
- if the local hash value does not match the golden hash value, then marking the information handling system as a non compliance device; and
- if the local hash value does match the golden hash value, then marking the information handling system as an assured device.

19. The non-transitory computer-readable medium of claim 18, wherein the method further comprises:
- in response to the local hash value not matching the golden hash value, sending a command to the information handling system to run a mitigation policy.

20. The non-transitory computer-readable medium of claim 18, wherein the first metadata includes a system identifier, a payload version, and a payload identifier of the next firmware component.

* * * * *